United States Patent
Hunt et al.

(10) Patent No.: US 6,496,855 B1
(45) Date of Patent: Dec. 17, 2002

(54) WEB SITE REGISTRATION PROXY SYSTEM

(75) Inventors: John F. W. Hunt, San Francisco, CA (US); Benedict T. S. Gladstone, San Francisco, CA (US); Kief S. Morris, London (GB); Patrick B. Kalaher, Cambridge, MA (US); Mark A. Byrn, Dublin (IE); Esa Moilanen, Zurich (CH); Peter R. Lidwell, Surrey (GB)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/516,048

(22) Filed: Jan. 21, 2000

Related U.S. Application Data
(60) Provisional application No. 60/122,537, filed on Mar. 2, 1999.

(51) Int. Cl.[7] .............................................. G06F 15/16
(52) U.S. Cl. ...................... 709/217; 709/202; 709/223; 709/228; 713/201; 713/202
(58) Field of Search ................................. 709/202, 217, 709/223, 228; 713/201, 202

(56) References Cited

U.S. PATENT DOCUMENTS

| | | | |
|---|---|---|---|
| 5,544,322 A | | 8/1996 | Cheng et al. |
| 5,590,197 A | * | 12/1996 | Chen et al. ................... 380/24 |
| 5,675,771 A | | 10/1997 | Curley et al. |
| 5,684,950 A | * | 11/1997 | Dare et al. ................... 713/201 |
| 5,694,595 A | | 12/1997 | Jacobs et al. |
| 5,729,689 A | * | 3/1998 | Allard et al. ................ 709/228 |
| 5,764,890 A | | 6/1998 | Glasser et al. |
| 5,784,463 A | | 7/1998 | Chen et al. |
| 5,790,785 A | * | 8/1998 | Klug et al. .................. 713/202 |
| 5,848,412 A | * | 12/1998 | Rowland et al. ............... 707/9 |
| 5,944,824 A | * | 8/1999 | He ............................. 713/201 |
| 5,983,351 A | * | 11/1999 | Glogau ....................... 713/201 |
| 6,000,033 A | * | 12/1999 | Kelley et al. ............... 713/201 |
| 6,092,196 A | * | 7/2000 | Reiche ........................ 713/200 |
| 6,226,679 B1 | * | 5/2001 | Gupta ......................... 709/230 |
| 6,253,327 B1 | * | 6/2001 | Zhang et al. ................ 713/201 |

FOREIGN PATENT DOCUMENTS

EP 0 855 659 A1 7/1998

OTHER PUBLICATIONS

"Microsoft Make E–Commerce Simpler", The Times, UK, Mar. 10, 1999, p. 7.*
"Battle Password Amnesia", by Joseph Schorr, MacWorld Feb. 2000. 1 ½ pages.*

(List continued on next page.)

*Primary Examiner*—Krisna Lim
(74) *Attorney, Agent, or Firm*—Michael A. Glenn; Kirk D. Wong (57) ABSTRACT

The present invention provides a registration agent site (4) which presents a simple intermediary between sites (3) and internet users (1) that acts a single source of data entry, user name and password for users. This allows users to register with new sites automatically and move between registered sites via a single interface, while allowing changes in profile information via the same interface. The registration agent site (4) acts as the agent for the internet user (1) rather than the site owner, allowing registration by proxy in a manner which is transparent to other sites. The agent negotiates connectivity and connects the user.

20 Claims, 4 Drawing Sheets

OTHER PUBLICATIONS

"Passwords—Who Needs 'Em? Digital Wallets Help Shoppers. (Microsoft Passport and Novell digitalme systems/data security software", by Lincoln Spector, PC World, Mar. 2000, ½ page.*

"Online Shopping with a click on your wallet", by Tim Jackson, The financial Time, Jan. 1999. ½ page.*

"Firefly Network extends open platform for personalized wed site or desktop application", Business Wire, Feb. 1997, 1½ pages.*

"WebKey 1.0.5", NewTek Industries, 10/99, ½ page.*

"Tools Rein In Data Collection", by Richard Karpinski, Internetweek, vol. 758, P1(2), Mar. 29, 1999.*

"Round Two for Internet Payments", by Richard Karpinski, Interweek, vol. 756 P13(1), Mar. 15, 1999.*

"I/Pro Tells Consumers What's In It for Them", by Kathleen Murphy, Web Week, vol. 2, Issue 3, Mar. 1996.

"Microsoft Captures Firefly", by Jim Kerstetter, *PC Week*, Apr. 10, 1998.

Vaughn, Brian et al., "How to Register a Workstation," Zenworks Cool Solutions May 28, 1999; available from internet <URL:http://www.novel.com/coolsolutions/zenworks/basics_ws_register.html>.

* cited by examiner

WEB SITE REGISTRATION PROXY SYSTEM

This application claims benefit of No. 60/122,537 filed Mar. 2, 1999.

FIELD OF THE INVENTION

The present invention relates to the registration of internet users at websites.

BACKGROUND TO THE INVENTION

Before using many websites, internet users need to fill in an often cumbersome registration form providing personal data. Site owners require this information for marketing purposes and to personalise the offering to customers. Registration demands can range from the basic requirement of a name and email address to a detailed request for personal information including street address, employment details and even salary levels. This process gives rise to a number of problems for users. Registration is often slow and not intuitive, with an additional problem that formats differ from site to site. Once registered with more than one site, users also have the problem of keeping track of the different user names and passwords that they use. When a user's information changes (email, addresses etc.) the management of multiple registrations becomes unwieldy. Furthermore, users have little or no control of information released to sites which can on-sell the personal data leading to both a breach of individual privacy and, perhaps inevitably, an accompanying barrage of unwanted direct marketing emails or "spam".

A typical internet user may be registered with between four and ten sites and would probably register with one new site each month. The greater these numbers the more serious the problem becomes. New users and sites are coming to the internet at exponential rates of growth so this problem can only get worse.

Though necessary for their business model, registration also poses a major problem to site owners. Users quite often enter bogus information (often several times having forgotten their password and thus having to register anew), which is of no use to site owners whilst bearing a data storage cost. Bogus information is entered for a number of reasons: frustration with the speed of the registration process, a general mistrust of the security and subsequent use of the data, or simply because the user has forgotten the previous registration details. Indeed, as much as 50% of all consumer data held by major sites on the internet is estimated to be false. Even genuine registration data becomes inaccurate over time if it is not up-dated.

Another problem is that users frustrated with the registration process will stop before completion so that the site loses a new potential customer. It is estimated that over 50% of potential users are lost due to aborted registrations.

SUMMARY OF THE INVENTION

According to a first aspect of the present invention, in an arrangement comprising at least one computer network connecting at least one personal computer to at least one service computer, the personal computer being associated with at least one user, a method for managing the registration of the user with the at least one service computer, the method comprising the steps of:

gathering registration data for the at least one service computer;

storing the registration data in at least one data structure on at least one registration agent computer connected to the computer network;

gathering personal data for the user;

storing at least part of the personal data in at least one data structure on at least one registration agent computer connected to the computer network; and, in response to a request from the user to a registration agent computer connected to the computer network to register the user with the at least one service computer, submitting an application to register the user with the at least one service computer by transmitting registration information from at least one registration agent computer to the service computer, the registration information being compiled from data obtained by accessing the users personal data stored in the associated data structure and by accessing registration data for the service computer stored in the associated data structure.

The service computer may be a product-provider and/or an information-provider.

According to a second aspect of the present invention, in a method for registering a user at a client node of a communications network with at least one server node connected to the communications network by the use of at least one registration agent server node connected to the communications network which stores personal data associated with the user together with registration data associated with the at least one server node, the method comprising the steps of registering the user with the at least one server node in response to a user request received at the registration agent server node by completing and transmitting on behalf of the user a registration application from the registration agent server node to the at least one server node based on the personal data associated with the user and the registration data associated with the at least one server node.

Preferably, the computer or communications network utilises an internet protocol.

Preferably, each of the service computer or server nodes is a website having a server connected to an internet or intranet. Preferably, the at least one registration agent computer or registration agent server node is connected to an internet, intranet or internet protocol (IP) network.

Preferably, the at least one registration agent computer or registration agent server node is a World Wide Web server.

Preferably, the at least one registration agent computer or registration agent server node operates a World Wide Web site.

Preferably, the step of transmitting an application to register the user is preceded by the step of verifying a user identification and more preferably, a password, entered by the user which identifies the user with respect to the associated personal data.

Preferably, the method includes the steps of storing personal data in the form of a master user profile data structure which uniquely describes the user, together with a number of personal registration data structures, each of which describes registration data associated with the successful registration of the user with a service computer or server node. The personal registration data structures permit repeat visits to the service computer or server node without the user having to go through the registration procedure again.

Preferably, the method includes the step of accepting user inputs which define a privacy policy in relation to the user's personal data which describes the extent to which the personal data is to be released for the purpose of submitting a registration application.

Preferably, the method includes the step of providing a unique proxy address for the user in a registration application so that communications addressed to the user using the unique address are received by the at least one registration agent computer or registration agent server and are subsequently forwarded to the user. More preferably, the communications are forwarded to the user in dependence on an email filtering policy accepted by the user. Most preferably, a different proxy address for the user is allocated for each subsequent registration with other service computers or server nodes.

According to a third aspect of the present invention, an apparatus for managing the registration of a user in accordance with either one of the first and second aspects of the present invention, comprises:

means for storing registration data;

means for storing personal data;

means for receiving a user request to submit a registration application on behalf of the user to a remote site;

means for completing a registration application based on a combination of personal data associated with the user and registration data associated with the remote site; and, means for transmitting a completed registration application to the remote site on behalf of the user.

Preferably, the apparatus comprises a computer storage medium containing computer executable instructions for performing the method of either one of the first and second aspects of the present invention. More preferably, the apparatus comprises a server. Most preferably, the server is arranged to provide a website having a unique resource locator (URL).

In one example, the present invention provides a registration agent site which presents a simple intermediary between sites and internet users that acts a single source of data entry, user name and password for users. This allows users to register with new sites automatically and move between registered sites via a single interface, whilst allowing changes in profile information via the same interface. The registration agent site acts as the agent for the internet user rather than the site owner, allowing registration by proxy in a manner which is transparent to other sites. The agent negotiates connectivity and connects the user.

In terms of the internet user, the benefits of using the interface provided by the registration agent site can be summarised as follows: the interface provides a convenient way of navigating between sites since it is necessary to remember only one password; the interface provides an effortless way of registering with new sites; it offers the ability to effect a global change across sites; it provides for the control of privacy by allowing the user to define a privacy policy; and, it allows for the integration of email filtering by proxy to prevent "spamming".

The registration agent site provides a central repository of all personal information that an individual internet user is, at least to some extent, prepared to give out to sites in order to register with the site. Personal details particular to each site registration are stored as well as a master profile of all personal information. This information can be recalled and modified via the interface. Accordingly, the user of the interface will know what personal information has been given out and to whom as well as the totality of information given out to all sites. Users are able to impose specific controls on how their personal information is used to register with a site including the complete prohibition of the use of certain information, provided this does not conflict with a site's registration requirements. If there is a conflict, the interface allows this to be resolved by deferring to the user for a final decision.

Figure 2:
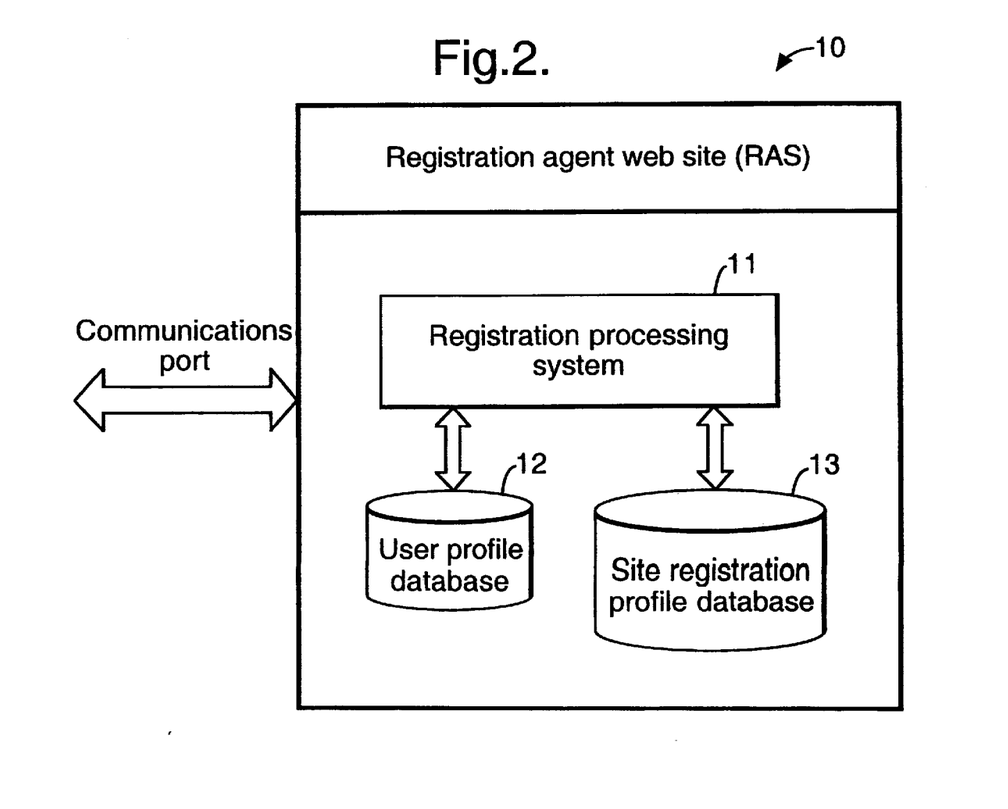
FIG. 2 is a simplified block diagram of an example of a registration agent website server.

Referring to FIG. 2, in summary, the service that the interface of the registration agent site 10 provides is one of assisting internet users to complete registration forms for websites by proxy, and logging into their sites on repeat visits. The user does not have to retype information, can have different profiles, can automatically check privacy policies, can review what data has been given out and to whom, and can protect their email address. Indeed, a key component of helping users control their interaction with sites is to protect their email address from being abused by the sites they give it to. The present invention's registration processing system 11 offers the option to give protected email addresses to sites when a user registers through the interface. The site does not receive the user's real address, but is instead given a unique proxy address by the registration processing system 11 (a different one for each site). Email sent to that address is forwarded by the registration processing system 11 to the user's email account. This allows users to selectively cut "spammers" off without having to change their email address. It also allows users to identify which sites are giving their email addresses to third parties which use it for "spam".

In summary, the service that the interface of the registration agent site provides is one of assisting internet users to complete registration forms for websites by proxy, and logging into their sites on repeat visits. The user does not have to retype information, can have different profiles, can automatically check privacy policies, can review what data has been given out and to whom, and can protect their email address. Indeed, a key component of helping users control their interaction with sites is to protect their email address from being abused by the sites they give it to. The present invention offers the option to give protected email addresses to sites when a user registers through the interface. The site does not receive the users real address, but is instead given a unique proxy address (a different one for each site). Email sent to that address is forwarded to the users email account. This allows users to selectively cut "spammers" off without having to change their email address. It also allows users to identify which sites are giving their email addresses to third parties which use it for "spam".

BRIEF DESCRIPTION OF THE DRAWINGS

An example of the present invention will now be described in detail with reference to the accompanying drawings, in which.

DETAILED DESCRIPTION

Figure 1:
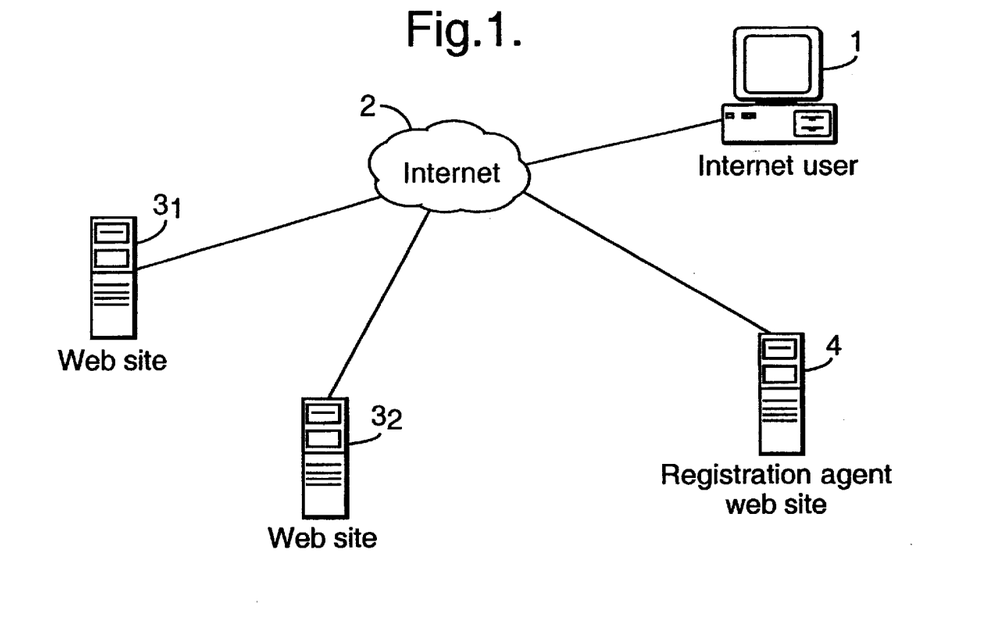
FIG. 1 is a simplified schematic diagram showing an internet user's computer connected to the World Wide Web.

FIG. 1 is a simplified schematic diagram showing an internet user's computer 1 connected to the World Wide Web 2. The internet user's computer 1 uses web browsers to navigate the World Wide Web to access desired services, known as websites 3. Many websites require an internet user to register at the website, wherein the user is required to establish a user identification and optionally a password for the website. Typically, the user is also asked to provide other personal information, not all of which is mandatory. The present invention provides a registration agent site (RAS) 4, in this example a web server, which presents a simple intermediary between sites and internet users that acts as a single source of data entry, username and password for users. The invention allows users to register with new sites automatically and move between registered sites via a single interface, whilst allowing changes in profile information via the same interface. The interface acts as the agent for the internet user rather than the site owner, allowing registration by proxy.

FIG. 2 is a simplified block diagram of an example of a registration agent site 10. The web server includes a registration processing system 11 which controls the steps of lodging a registration with websites on behalf of internet users who are registered members of the registration agent site. The server stores user profiles in a user database 12 which represent a master profile of all personal information, including a privacy policy, and personal details particular to each website where the user has registered to date. Each website that is affiliated with the registration agent site is represented in a registration profile database 13 where details of the site registration requirements, including the registration forms used by the website, are stored.

The core service provided by the registration agent site 10 is one of assisting users to fill out forms on websites, primarily targeted towards registering with new sites and logging into sites on repeat visits. The user does not have to retype information, can have different profiles, can automatically check privacy policies, can review what data they gave out and to whom, and can protect their email address. The system does not require any plug-ins or software downloads, and is browser independent.

The registration processing system 11 is responsible for submitting user data to a site's registration system. This involves the following functionality:
1. analysing the site's data requirements and forms handling system (in other words, what data do they want from the user and how does their registration system work?);
2. determining the site's data privacy policies;
3. marshalling the appropriate user data;
4. identifying and resolving conflicts between the user's privacy preferences and the site's policies;
5. providing the data to the sites; and,
6. storing information about the transaction.

The functionality and data requirements can be divided into three sections: interfacing with target sites, managing and using data, and interfacing with the users.

When a user wants to fill out a form on a site, the registration agent site 10 must marshal the appropriate user data and provide it to the target site. This implies two core parts of the interface: determining what data the site needs and supplying the data to the site.

A simple way to supply data to sites is to submit it directly to the site's own forms processing applications in the format it expects it. This involves making an HTTP GET or POST request to the uniform resource indicator (URI) to which the site's own HTML forms submit their data. Alternatives include using JavaScript to fill the site's form or proxying form submission. In the latter, the registration processing system acts as an HTTP client, connects to the target site's webserver and submits the form. Moreover, preferably, the registration processing system 11 uses a process which emulates the normal registration by a user by providing a form which duplicates the data submission of the site's own form. The registration processing system 11 generates an HTML page which is dynamic and which contains a form with all of the relevant data fields of the site's own form. The target for this form submission is the same URI which the site's form submits to.

Any system for submitting data to a site on behalf of a user will need certain information about the site and its form system, which is termed Site Data Requirements (SDR). A given site's SDR is stored in the registration profile database 13, and needs to include at least some of the following information:

1. what forms are on the site?
2. what are the site's data privacy policies? Is there any relevant third party auditing or accreditation?
3. for each form, what URI is the form submitted to?
4. for each form, what data fields are needed?
5. for each data field, is the data contained in the user profile, and if so, which field of the profile?
6. for each data field, if the data is not contained in the user file, what description should be shown to the user to explain what is needed?
7. for each data field, what values are acceptable as input? This includes whether the field is required or optional;
8. for each data field, what name is it given by the site's forms processing system? and,
9. for each data field, is the user's data going to be unique to this site, for example user name and password, as opposed to something which can be the same on all sites, such as postal code?

SDRs can be determined in a number of ways. In one example, an individual must first analyse the sites to determine the requirements and enter the information into the registration profile database 13. It would then be possible to update the stored data to take account of any changes which subsequently occur. This update may be implemented automatically. In another example, it may be possible to interrogate the site automatically in an intelligent fashion to determine the SDR. Affiliated sites may also cooperate by embedding encoded information into their HTML forms to allow the SDRs to be determined automatically by the registration processing system.

The user profile database 12 stores a collection of data for each user. A user is able to view all data maintained about them as an individual and normally no one else has access to this without the express permission of the user.

The user profile file structure includes personal preferences data which is used as part of the interaction with the registration agent site and includes the user name and password, as well as information for customisation of the user interface. This information is not available to sites.

The user profile file structure also includes privacy preferences data which describe the policies the user would like a site to have if their data is to be given to the site by the registration agent site. This covers general policies for the site, whether or not the site's policies are certified, and also links policy choices to individual fields of the user personal data (described below). This linking allows users to specify that some data is more sensitive than others, so a site which only asks for low sensitivity data is not expected to have as rigorous a data privacy policy as a site which wants more sensitive data.

As mentioned above, the user profile file structure also includes personal data which is available to sites the user chooses to register with (although the data is still subject to the privacy settings described above). The registration agent site 10 stores a core profile which is a set of data fields required by more than one site. Users can have more than one set of core profile data which allows them to maintain a set of different "personalities", for example one for a work address and one for a home address.

Other personal data can be stored in site-specific user profiles forming part of the user profile file structure. These may consist of data which the user has supplied to a particular site, but which is not used for other sites. Examples include a user name and password for a site, or preference data specific to one site.

The registration processing system 11 also allows users the option to give "protected" email addresses to sites rather than their normal address. When a site requests the user's email address, the interface generates a new address in a mail domain and supplies that to the site. Email to the address is forwarded by the registration agent's system to the user's real email address, including a header indicating which site it originated from. Mail is not stored by the system, merely forwarded. The user can disable a protected address to prevent unwanted mail from reaching them.

The web server which supports the registration processing system and associated databases includes a server platform with appropriate hardware and an operating system, mail serving software, and a hosting service. The databases may be provided on the same machine or from a remote source which is networked to the web server.

A user can be introduced to the registration agent site 10 by navigating directly to the associated URL, from an affiliated site where they are registering for the first time (they are presented with a registration button which provides a link to the registration agent site), or from an affiliated site where they are already registered (where again they are presented with a registration button). In the latter case, the user is prompted by the registration agent site 10 to provide their existing user name and password for the site either before or after registering with the registration agent.

When registering for the first time with the registration agent site 10, the user is presented with a form generated dynamically to gather the minimum information they need, given the circumstances. Core information required to sign up a new member includes the user's email address (which is subsequently verified). The new member chooses a username and password which is required on all subsequent visits to the registration agent site. If the new member is registering with a new site at this time, the user is presented with a form which sets out the information that the site will want for registration. The user is also presented with the option of filling out data fields required by most affiliated sites which will make signing up with new sites faster next time.

The information may be grouped into different categories, for example:

1. basic information (name, email address);
2. professional contact information (work address and phone number, etc);
3. personal contact information (home address, etc);
4. profession demographics job title, etc); and,
5. personal demographics (size of family, hobbies, interests, dislikes, etc).

For each information group, the user chooses an information policy, which tells the registration agent site 10 when and to whom the information in that category can be given out. In this example, the choices are colour coded similar to traffic light colours. Green data is data that can be given out to any site the user wishes to register with. Yellow data can be given to a site which matches certain criteria the user sets. Red data will not be given out at all by the registration agent site, unless the user specifically agrees to it at the time the data is requested. The user can choose the circumstances under which the data they tag as yellow can be given to sites they register with. For example, the user may specify that the site must have certain data handling policies in place and perhaps that these policies must be verified by an independent agency.

As described above, there are a number of ways that an internet user can become a member of the registration agent site 10 and some examples of these will be described below. Throughout, the registration agent site and the interface it provides shall be referred to as "RAS".

Figure 3:
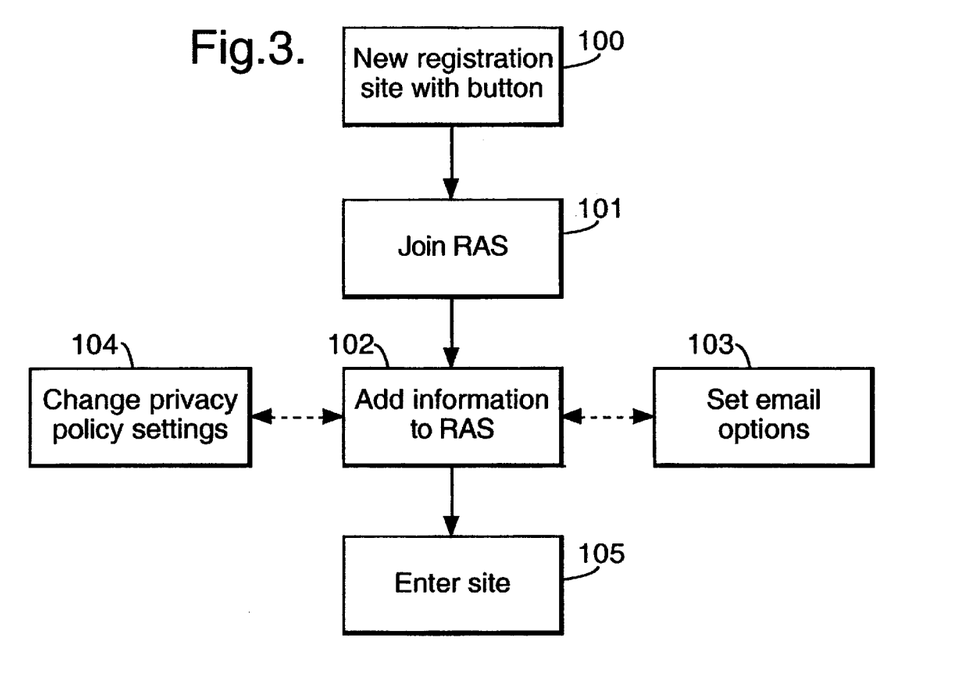
FIGS. 3 and 4 show an example of an internet user registering with a website; and, FIGS. 5 and 6 show an example of an internet user transferring registration information for a number of websites to a registration agent website.
Figure 4:
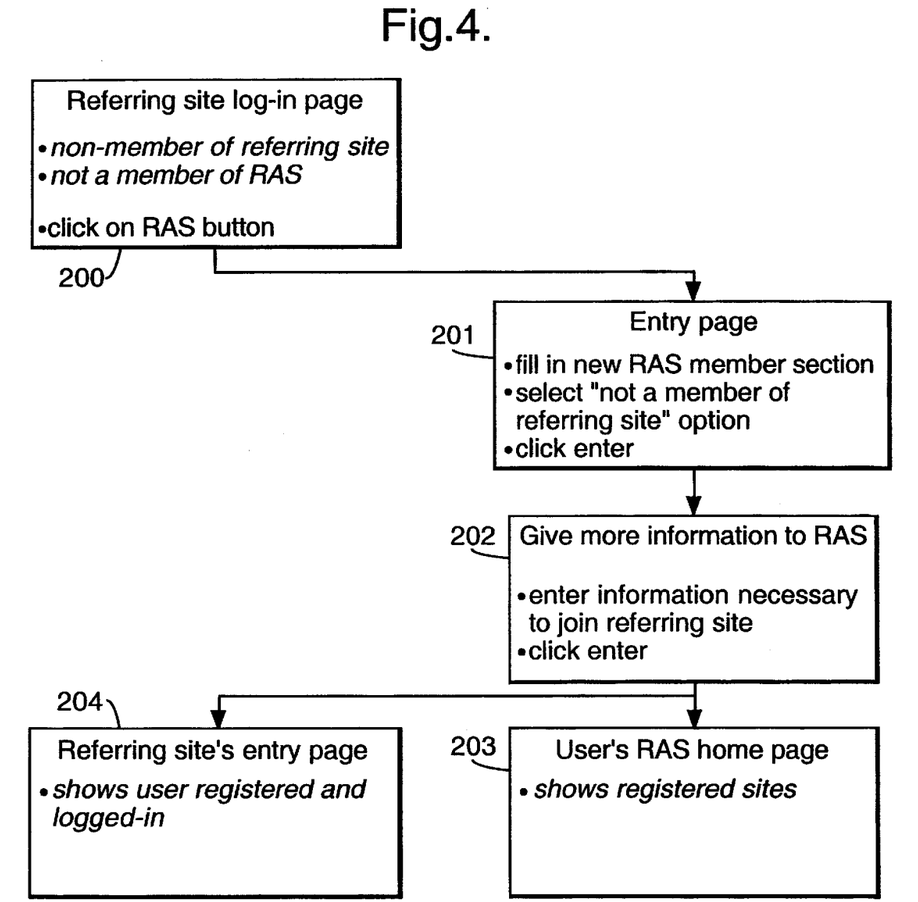

In FIGS. 3 and 4, it is assumed that the internet user has navigated the World Wide Web using a web browser (step 100 or 200) to arrive at the login page of a website (referring site), of which they are not already a member, but which is affiliated with the RAS and provides a button or other icon with a URL to the RAS web server. The user is not already a member of the RAS. The user clicks on the RAS button appearing on the login page and a pop-up window appears and the browser window of the referring site goes behind. In step 101 or 201 the user completes the new member section of an entry page, giving a username, password, email address and language. The user then selects an option that says that they are not already a member of the referring site and clicks on an "enter" button. A new page then appears in step 102 or 202 requesting additional information that is necessary for the user to actually register with the referring site. The site requirements are determined by accessing the registration profile database 13. A master user profile for the new member is created and stored in the user profile database 12, together with a personal profile for the new registration. Once the user has provided the additional information, they click "enter" and the user's new home page for the RAS appears (in step 203) showing the referring site as a registered site and a separate list suggesting other affiliated sites where the user may wish to register. The RAS pop-up window is then hidden behind the referring site window, which itself changes to the page showing that the user has successfully registered with the site.

In future, it is possible to logon to the same website by navigating directly to the RAS website (by typing the address for the registration agent site, assigning a bookmark or clicking on an advertisement banner), and then clicking on the listed entry for the site on the user's home page. Alternatively, the user can navigate directly to the website itself, click on the RAS button, and logon via the RAS website.

In each of the above cases, whether the procedure be a simple logon or a new registration, it is preferred that the process is entirely transparent to the website of interest in the sense that it is wholly unaware of the involvement of an intermediary.

Figure 5:
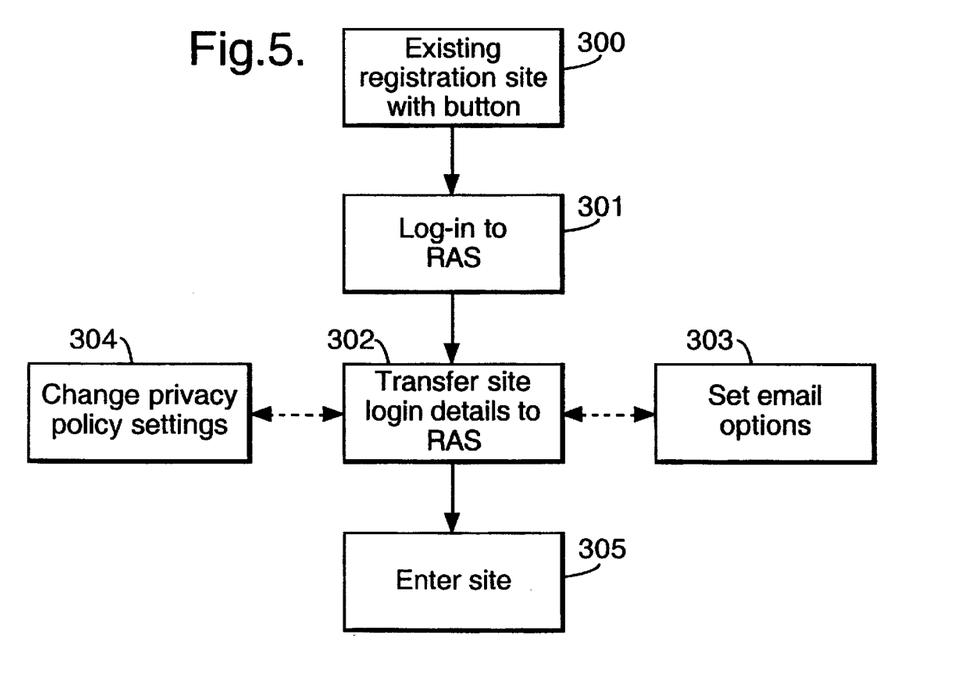
Figure 6:
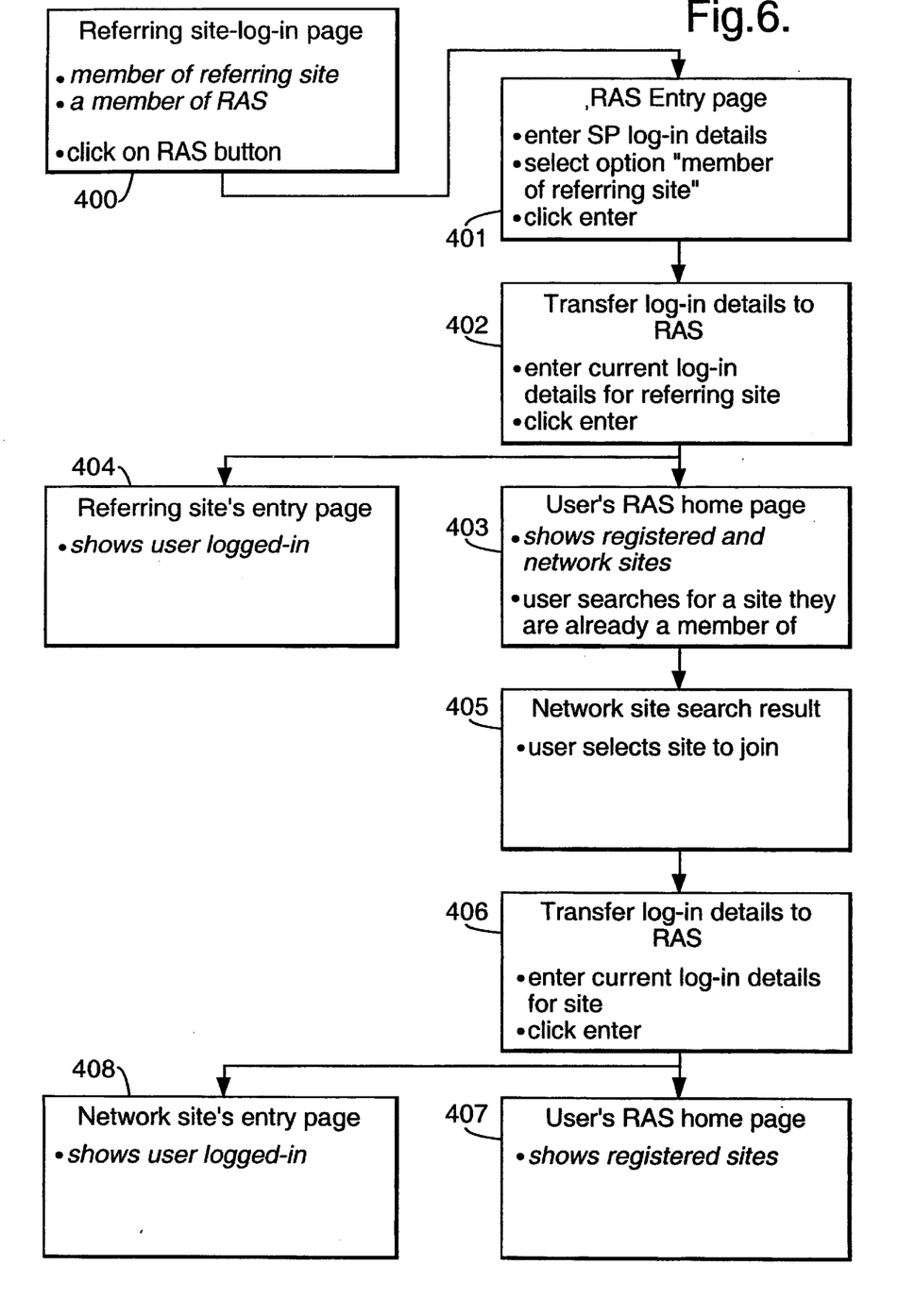

In FIGS. 5 and 6, the internet user is already a member of both the RAS and a particular website (referring site). Again, the user is assumed to have navigated (in step 300 or 400) to the logon page of the referring site using their web browser, but is seeking a more convenient way to sign in to the website. In step 301 or 401 the user clicks on the RAS button and a RAS pop-up window appears over the browser window of the referring site. The user enters their username and password for the RAS and selects the option that says that they are already a member of the referring site. The user then clicks "enter" and a new page appears with a request for the user's current login details for the referred site. In step 302 or 402 the user enters their current login details for the referring site and then clicks the "enter" button. The user's RAS home page then appears showing the referring site as a registered site (in step 403). A personal profile for this site is created and stored in the user's profile database 12 for future use.

In the example shown in FIG. 6, the internet user decides to repeat the process in steps 405 and 406 for other sites which they are members of (but have registered with the sites independently of the RAS). The user switches back to the RAS window and on the home page enters the site name into a search box. The search results are displayed to the user in step 405 who then selects the appropriate site and the transfer of login details process is repeated as above in step 406.

An important aspect of the present invention is that it is possible for the user to specify a privacy policy (indicated in steps 103 and 104) which may restrict to some extent information the user is prepared to provide to sites in order to complete the site's registration forms. From knowledge of the registration requirements of each affiliated site (stored in the registration profile database), it is possible for the registration agent site 10 to determine whether or not a particular item of personal information is mandatory and subsequently warn a user that there is a policy clash before an attempt to register with the site is made. A user can be given the option of making an exception in the circumstances or amending their global policy for the item of data in question.

In summary, the present invention provides a central repository of all personal information that an individual internet user is, at least to some extent, prepared to give out to sites in order to register with the site. Personal details particular to each site registration are stored as well as a master profile of all personal information. This information can be recalled and modified via the interface. Accordingly, the user of the interface will know what personal information has been given out and to whom as well as the totality of information given out to all sites. Users are able to impose specific controls on how their personal information is used to register with a site including the complete prohibition of the use of certain information, provided this does not conflict with a site's registration requirements. If there is a conflict, the interface allows this to be resolved by deferring to the user for a final decision.

What is claimed is:

1. An arrangement comprising at least one computer network connected to at least one service computer, the terminal being associated with at least one user, a method for managing the registration of the user with the at least one service computer, the method comprising the steps of:

gathering registration data for the at least one service computer;

storing the registration data in at least one data structure on at least one registration agent computer connected to the computer network;

gathering personal data for the user;

storing at least part of the personal data in at least one data structure on at least one registration agent computer connected to the computer network;

in response to a request from the user to a registration agent computer connected to the computer network to register the user with the at least one service computer, submitting an application to register the user with the at least one service computer by transmitting registration information from at least one registration agent computer to the service computer, the registration information being compiled from data obtained by accessing the user's personal data stored in the associated data structure and by accessing registration data for the service computer stored in the associated data structure; and providing a unique proxy address for the user in a registration application so that communications addressed to the user using the unique address are received by the at least one registration agent computer or registration agent server and are subsequently forwarded to the user, including a header indicating which service computer a communication originated from.

2. A method according to claim 1, in which a different proxy address for the user is allocated for each subsequent registration with other service computers or server nodes.

3. A method according to claim 1, in which the computer or communications network utilises an internet protocol.

4. A method according to claim 1, in which each of the service computer or server nodes is a website having a server connected to the internet or an intranet.

5. A method according to claim 1, in which the at least one registration agent computer or registration agent server node is connected to the internet, an intranet or an IP network.

6. A method according to claim 1, in which the at least one registration agent computer or registration agent server node is a World Wide Web server.

7. A method according to claim 6, in which the at least one registration agent computer or registration agent server node operates a World Wide Web site.

8. A method according to claim 1, in which the step of transmitting an application to register the user is preceded by the step of verifying a user identification and more preferably, a password, entered by the user which identifies the user with respect to the associated personal data.

9. A method according to claim 1, including the steps of storing personal data in the form of a master user profile data structure which uniquely describes the user, together with a number of personal registration data structures, each of which describes registration data associated with the successful registration of the user with a service computer or server node.

10. A method according to claim 9, in which the personal registration data structures permit repeat visits to the service computer or server node without the user having to go through the registration procedure again.

11. A method according to claim 9, including the step of accepting user inputs which define a privacy policy in relation to the user's personal data which describes the extent to which the personal data is to be released for the purpose of submitting a registration application.

12. A method according to claim 1, in which the communications are forwarded to the user in dependence on an email filtering policy accepted by the user.

13. A method for registering a user at a client node of a communications network with at least one server node connected to the communications network by the use of at least one registration agent server node connected to the communications network which stores personal data associated with the user together with registration data associated with the at least one server node, the method comprising the steps of registering the user with the at least one server node in response to a user request received at the registration agent server node by completing and transmitting on behalf of the user a registration application from the registration agent server node to the at least one server node based on the personal data associated with the user and the registration data associated with the at least one server node; and providing a unique proxy address for the user in a registration application so that communications addressed to the user using the unique address are received by the at least one registration agent computer or registration agent server and are subsequently forwarded to the user, including a header indicating which service computer a communication originated from.

14. A user interface and execution system for managing registration of a user with a service computer, wherein the user interface comprises:

memory means for storing registration data requirements for the at least one service computer in at least one data structure;

personal data input means for accepting personal data relating to the user;

memory means for storing at least part of the personal data in at least one data structure; and, processing means being operative to accept a request to register the user with the at least one service computer, to compile a registration request from data obtained by accessing the user's personal data stored in the associated data structure and by accessing registration data for the service computer stored in the associated data structure, to register the user with at least one service computer by transmitting the registration request to the service computer, and to provide a unique proxy address for the user in a registration request so that communications addressed to the user using the unique address are received by the processing means and are subsequently forwarded to the user, including a header indicating which service computer a communication originated from.

15. An apparatus for managing the registration of a user in accordance with the method of any preceding claim, comprising:

means for storing registration data;

means for storing personal data;

means for receiving a user request to submit a registration application on behalf of the user to a remote site;

means for completing a registration application based on a combination of personal data associated with the user and registration data associated with the remote site;

means for transmitting a completed registration application to the remote site on behalf of the user; and means for providing a unique proxy address for the user in a registration application so that communications addressed to the user using the unique address are received by a registration agent computer or a registration agent server and are subsequently forwarded to the user, including a header indicating which remote site a communication originated from.

16. An apparatus according to claim 15, comprising a computer storage medium containing computer executable instructions for performing a method of managing registration of a user, the method comprising:

gathering registration data for the at least one service computer;

storing the registration data in at least one data structure on at least one registration agent computer connected to the computer network;

gathering personal data for the user;

storing at least part of the personal data in at least one data structure on at least one registration agent computer connected to the computer network; and, in response to a request from the user to a registration agent computer connected to the computer network to register the user with the at least one service computer, submitting an application to register the user with the at least one service computer by transmitting registration information from at least one registration agent computer to the service computer, the registration information being compiled from data obtained by accessing the user's personal data stored in the associated data structure and by accessing registration data for the service computer stored in the associated data structure.

17. An apparatus according to claim 2, comprising a server.

18. An apparatus according to claim 17, in which the server is arranged to provide a website having a unique resource location (URL).

19. A method of registering with a number of service computer systems comprising the steps of visiting a WWW site hosting a registration management system;

submitting a registration application to the registration management system comprising a user identifier, password and personal data;

instructing the registration management system to submit a registration to one or more of the service computer systems using the submitted personal data; and submitting inputs to the registration management system which define a privacy policy in relation to the user's personal data, the extent to which the personal data is released for the purpose of submitting a registration application being dependent on the privacy policy.

20. A computer system for managing the registration of a user with a remote computer system comprising:

a memory storing registration data associated with one or more remote computer systems;

a memory storing personal data associated with one or more users;

a processor configured to accept a user request to submit a registration application on behalf of the user to a remote computer system, to complete a registration application based on a combination of personal data associated with the user and registration data associated with the remote computer system;

to submit the completed registration application to the remote site on behalf of the user; and, to provide a unique proxy address for the user in a registration application so that communications addressed to the user using the unique address are received by the processor and are subsequently forwarded to the user, including a header indicating which remote computer system a communication originated from.

* * * * *